United States Patent [19]

Ross

[11] Patent Number: 4,642,847
[45] Date of Patent: Feb. 17, 1987

[54] APPARATUS FOR FORMING SAUSAGE PRODUCTS

[76] Inventor: Henry M. Ross, 10527 Vint Hill Rd., Nokesville, Va. 22123

[21] Appl. No.: 785,510

[22] Filed: Oct. 8, 1985

[51] Int. Cl.$^4$ .............................................. A22C 7/00
[52] U.S. Cl. ......................................... 17/1 F; 17/32; 99/451; 99/483; 426/244; 426/245
[58] Field of Search ............................. 17/1 F, 32, 36; 426/244, 245, 246; 99/451, 483

[56] References Cited

U.S. PATENT DOCUMENTS

| | | | |
|---|---|---|---|
| 2,933,758 | 4/1960 | Moule | 17/32 |
| 3,005,716 | 10/1961 | Moreland | 426/245 |
| 3,132,950 | 5/1964 | Macy et al. | 17/32 X |
| 3,268,948 | 8/1966 | Swift | 17/32 |
| 4,293,979 | 10/1981 | Colosimo et al. | 17/1 F X |

FOREIGN PATENT DOCUMENTS 0615910  7/1978  U.S.S.R. .............................. 426/244

Primary Examiner—Willie G. Abercrombie
Attorney, Agent, or Firm—I. J. Crickenberger

[57] ABSTRACT

A sausage mold comprises a non-conductive, heat-resistant tube having opposed conductive pistons slidably mounted therein and connected as electrodes to a dual frequency power supply. Meat paste is extruded into a mold cavity defined between the pistons through a supply line having a valve mounted in the face of one of the pistons. The meat paste is cured within the mold and a coagulated skin is formed thereon by the application of electrical currents of 60 hertz and 4,000 to 10,000 hertz, respectively. A plurality of molds are arranged in a cluster to form a configuration resembling the shape of the package into which the sausages are to be placed.

5 Claims, 3 Drawing Figures

APPARATUS FOR FORMING SAUSAGE PRODUCTS

BACKGROUND OF THE INVENTION

This invention relates to an apparatus for forming sausage from meat paste without the use of external skins during the forming process.

Various methods of forming sausages have been employed in the past. One of the simplest methods consists of filling edible casings or skins of natural gut with sausage meat. The skins are then tied off in suitable lengths to form links which become the final salable product. Another method utilizes inedible casings which are filled and formed into links. A coagulated skin is then formed on the links within the casings by heat processing and the inedible casings are removed. In each of these methods an outer casing or skin is separately utilized in the forming process, thereby contributing substantially to the cost of manufacturing.

Sausage products have also been made without the use of separate casings. U.S. Pat. No. 4,280,803 discloses an apparatus which utilizes acid treatment of an extruded meat paste which is molded within a rigid cavity to produce a completely encased individual sausage. The acid is applied through the mold which is constructed of a permeable material. Such use of extruded meat paste in the process of manufacturing sausages adds the ability to provide precise weight control of the individual links since the meat paste can be metered precisely.

SUMMARY OF THE INVENTION

The present invention provides an apparatus which forms extruded meat paste into suitable link shapes within an enclosed mold cavity, and then processes the meat paste by heating it within the mold cavity to produce a coagulated skin. When the meat is removed from the cavity, it has the desired final shape, and is completely encased within the heat-formed skin.

The apparatus comprises a tubular mold constructed of a heat-resistant glass or similar material which is a non-conductor of electricity. Opposed pistons are slidably mounted within the tubular mold to define the mold cavity in conjunction with the interior tube wall located between them. The pistons are made of conductive material and serve as opposing electrodes to be connected to a power source which supplies currents at two different frequencies.

One of the pistons is connected to a source of meat paste by a supply line which terminates at a valve mounted in the face of the piston. When the meat paste is extruded through the supply line, the valve opens and the meat paste enters the mold cavity defined between the opposed pistons. The pressure exerted by the extruded meat paste against the pistons pushes them apart until a predetermined amount of meat paste has been injected into the mold cavity, at which time the extrusion process is terminated. The mold cavity then contains the exact amount of meat needed to make one sausage.

When the mold is filled, the meat paste is subjected to a heating process which causes a coagulated skin to be formed. The heat for this process is generated by the passage of electrical currents through the meat paste. A 60 hertz current is utilized to produce a uniform curing action in the meat paste, while a current in the range of 4,000 to 10,000 hertz is utilized to induce a more rapid surface heating, thereby forming a coagulated skin.

BRIEF DESCRIPTION OF THE DRAWING

The invention will now be described by way of example and with reference to the accompanying drawing in which.

DESCRIPTION OF THE INVENTION

Figure 1:
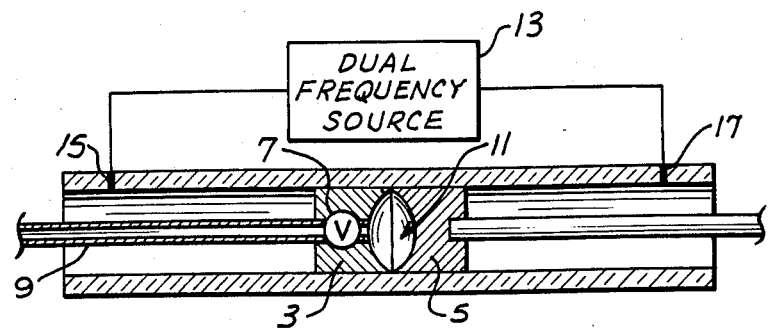
FIG. 1 is a cross-sectional view of a cylindrical mold for sausage products embodying the features of the invention and showing the mold in its initial position prior to the injecting of meat paste into the cylinder.

The invention will be understood more readily by referring to FIG. 1 of the drawing in which a hollow cylinder 1 has a pair of conductive piston members 3, 5 slidably mounted therein. Piston member 3 has a valve 7 integral therewith. Valve 7 is at the end of supply line 9 which is connected to a source (not shown) of meat paste under pressure for injection into the mold cavity indicated generally by the numeral 11.

A dual frequency electrical energy source 13 is connected to contact elements 15, 17 embedded in the non-conductive hollow cylinder 1. Contact elements 15, 17 are adapted to contact the conductive piston members 3, 5 near the outer ends of their travel, thereby completing an electrical circuit from the dual frequency source 13 through the meat paste in mold cavity 11. The dual frequency source is designed to operate at a frequency of 60 hertz and at a frequency between 4,000 and 10,000 hertz.

In operation, the piston members 3, 5 are initially together at the midpoint of hollow cylinder 1. A predetermined quantity of meat paste is injected into mold cavity 11 through supply line 9 and valve 7. The pressure of the meat paste against the interior faces of pistons 3, 5 is sufficient to force the pistons backwardly, thereby expanding mold cavity 11 until the final desired shape for the sausage link is attained. Valve 7 prevents the backward flow of meat paste. The volume of the mold cavity is designed such that the pistons reach the end of their travel and are in contact with contact elements 15, 17 just as the injection process is terminated.

When the conductive pistons contact the contact elements, the dual frequency electrical energy source sends currents of 60 hertz and 4,000 to 10,000 hertz through the meat paste in the mold cavity 11. The lower frequency current produces a general heating within the meat paste in accordance with the resistive effect of the meat paste to the passage of electrical energy. The high frequency current produces a localized heating near the surface of the cylindrically-formed meat paste in accordance with the well-known skin effect behavior of high frequency currents. The result of these general and localized heating processes is the proper curing of the sausage product concurrent with the formation of a coagulated skin which acts to contain the cooked meat paste and to retain the cylindrical shape defined by the molding procedure.

Figure 2:
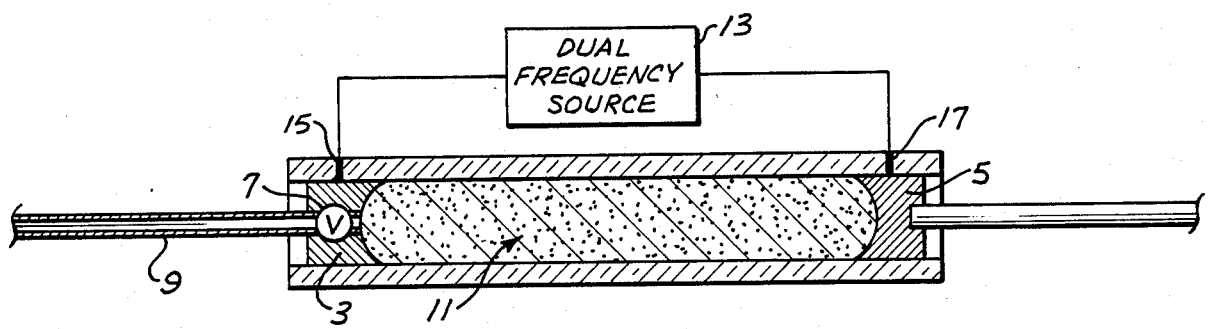
FIG. 2 is a cross-sectional view of the mold shown in FIG. 1 in its final position following the injecting of meat paste into the cylinder.
Figure 3:
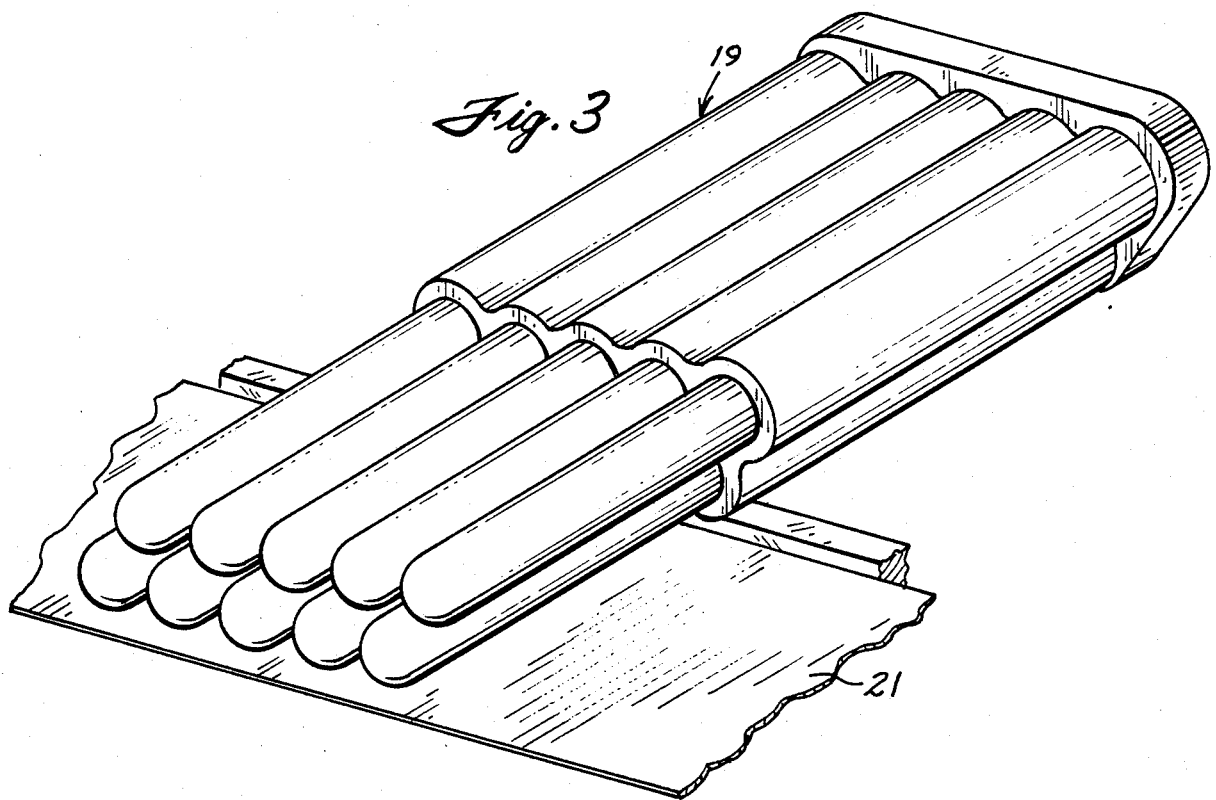
FIG. 3 is a partial perspective view of an embodiment of the invention in which a plurality of molds, such as the mold shown in FIGS. 1 and 2, are assembled in a configuration corresponding to the shape of the package into which the sausages are to be placed.

The handling and packaging of the final sausage product can be facilitated greatly by assembling the cylindrical molds into a cluster which is configured to have the shape of the packaged product. FIG. 3 illustrates such a configuration. Eight cylindrical molds, each of which is identical in construction and operation to the mold shown in FIGS. 1 and 2, are configured in a cluster shown at 19 to form the shape of a typical package of "hot dogs" as they are sold in retail supermarkets. In this arrangement a packaging apparatus (not shown) is provided to package the sausages as they are ejected from the molds to fall onto a conventional conveyor belt 21.

What is claimed is:

1. In an apparatus for forming sausage products, the combination comprising
   a hollow cylinder,
   electrode piston means slidably mounted at opposite ends of said cylinder to define a mold cavity therebetween,
   means for injecting meat paste into said mold cavity under pressure, said meat paste thereby making contact with and forcing apart said electrode piston means until a predetermined amount of paste has filled the cavity to define the length of sausage being formed,
   said means for injecting meat paste comprising valve means mounted in said electrode means,
   power supply means connected to said electrode means, said power supply means being operable at plural frequencies,
   whereby electric currents of different frequencies are produced between the electrode means to form a coagulated surface on the meat paste within said mold cavity.

2. The combination according to claim 1 wherein said power supply means comprises a first current source operating at a frequency of 60 hertz and a second current source operating at a frequency in excess of 4,000 hertz.

3. In an apparatus for forming sausage products, the combination comprising
   a hollow cylinder of non-conductive material,
   a pair of pistons mounted within said cylinder for movement back and forth along its length,
   valve means mounted within one of said pistons to allow the passage of meat paste into that portion of the cylinder between the two pistons,
   means for injecting meat paste under pressure into said cylinder to make contact with and force apart the pistons to define the length of sausage being formed,
   power supply means operable at plural frequencies,
   means connecting said power supply means to said pistons whereby said pistons serve as electrodes located at opposite ends of said hollow cylinder with meat paste therebetween, and
   means to energize said power supply means to create electrical currents at different frequencies between said pistons,
   whereby the lower frequency current causes a resistive heating effect within the paste, and the higher frequency current causes a skin-effect heating along the surface of the paste to produce a coagulated skin.

4. The combination according to claim 3 wherein said power supply means comprises a first current source operating at a frequency of 60 hertz and a second current source operating at a frequency in excess of 4,000 hertz.

5. The combination according to claim 3 wherein said apparatus comprises
   a plurality of said hollow cylinders arranged in rows to form a configuration corresponding to the shape of the package into which the sausages are to be placed, thereby facilitating the handling and packaging of the sausage products.

* * * * *